United States Patent [19]
Attenasio et al.

[11] Patent Number: 5,489,105
[45] Date of Patent: Feb. 6, 1996

[54] SLEEVE FOR SHAFT SEAL

[75] Inventors: Ann Attenasio, N. Andover, Mass.; Henri Azibert, Windham; Margaret Willbrant, Derry, both of N.H.

[73] Assignee: A.W. Chesterton Co., Stoneham, Mass.

[21] Appl. No.: 132,286

[22] Filed: Oct. 6, 1993

[51] Int. Cl.$^6$ ....................................................... F16J 15/34
[52] U.S. Cl. ............................... 277/38; 277/65; 277/94; 277/136
[58] Field of Search .................................. 277/38, 39, 40, 277/41, 59, 65, 81 R, 82, 94, 136, 137; 411/508

[56] References Cited

U.S. PATENT DOCUMENTS

| | | |
|---|---|---|
| 1,308,454 | 7/1919 | Somes . |
| 2,247,505 | 7/1941 | Kohler . |
| 2,859,054 | 11/1958 | Willi . |
| 2,882,076 | 4/1959 | Caser et al. ................................ 277/38 |
| 3,127,183 | 3/1964 | Talamonti ................................. 277/40 |
| 3,191,945 | 6/1965 | Andresen ................................ 277/137 |
| 3,222,077 | 12/1965 | Snabes ..................................... 277/40 |
| 3,245,692 | 4/1966 | Veitik ...................................... 277/40 |
| 3,356,378 | 12/1967 | Tracy . |
| 3,672,689 | 6/1972 | Hadley . |
| 3,715,169 | 2/1973 | Molis . |
| 3,788,650 | 1/1974 | Place . |
| 4,174,844 | 11/1979 | Zobens . |
| 4,377,290 | 3/1983 | Netzel . |
| 4,443,015 | 4/1984 | Duffee et al. . |
| 4,762,436 | 8/1988 | Mitomi .................................... 411/508 |
| 4,952,106 | 8/1990 | Kubagochi et al. .................... 411/508 |
| 5,116,066 | 5/1992 | Crawford . |

FOREIGN PATENT DOCUMENTS 714377  11/1941  Germany .

*Primary Examiner*—Daniel G. DePumpo
*Attorney, Agent, or Firm*—Hill, Steadman & Simpson

[57] ABSTRACT

A shaft sleeve for a mechanical seal assembly having fixed radial lugs for rotationally anchoring one seal ring on an inboard side of the sleeve and depressible anchors for rotationally anchoring a second sealing ring on an outboard side of the seal assembly, the depressible anchors allowing sealing rings and holding rings and other component parts to pass from an outboard side to an inboard side by depressing the flexible anchors radially inwardly. The flexible anchors also fix in axial position a collar which mounts the outboard rotary seal ring. The sleeve provides for advantageous stacking of ring components onto the sleeve for assembly of the seal assembly.

24 Claims, 2 Drawing Sheets

5,489,105

SLEEVE FOR SHAFT SEAL

BACKGROUND OF THE INVENTION

The present invention relates to a seal assembly for sealing a rotating shaft to a stationary housing such as sealing a pump shaft to a pump casing. The mechanical seal typically provides one or two pairs of seal rings, one of each pair being stationary with respect to said housing and the respective other of said seal rings being mounted for rotation with the shaft and having face contact with its respective matched stationary seal ring. When two such pairs of seal rings are used, a volume between the seal rings may be flushed with a barrier fluid to quench the seal as well as providing a secondary source of sealing and/or a source of lubrication.

In a seal arrangement such as disclosed in U.S. Pat. No. 5,116,066, an outboard seal assembly A and an inboard seal assembly B are shown in FIG. 4. A volume between the seals can be flushed with quench fluid. The rotating seal faces rotate with the pump shaft. To accomplish this, a sleeve is mounted tightly around the shaft and fixed thereto by a lock ring with set screws. One rotating ring is held within a holder which is fixed for rotation with the sleeve by a plurality of balls which are captured within spherical cavities in the sleeve and within an axial groove formed in the holder, or within a second hemispherical cavity in a set screw of the second rotating seal face holder.

U.S. Pat. No. 4,377,290 discloses a double seal arrangement wherein the rotating seal rings are locked to a flange 52 extending upward from a shaft sleeve by a pin to constrain the rotating sealing ring for rotation with the shaft.

U.S. Pat. No. 3,356,378 discloses the locking of a rotary sealing ring to a backing ring by an encircling mounting ring having one or more keys which causes the rotary sealing ring, the mounting ring, a bellows subassembly, and a shaft sleeve to rotate with the shaft.

U.S. Pat. No. 3,715,169 uses a bushing surrounding the shaft and locked thereto for rotation by a threaded plug 31, wherein the bushing is locked to another bushing which holds the rotating seal ring, the bushing, the other bushing and the seal ring 42 held together by axially arranged pins.

U.S. Pat. No. 2,247,505 discloses a shaft 10 having an annular collar secured thereto by set screws. A rotatable sealing member is locked for rotation with the annular collar by a plurality of radially extending pins 20.

A locking tab arrangement formed with a shaft sleeve for locking rotary seal rings is not disclosed.

SUMMARY OF THE INVENTION

It is an object of the present invention to provide a mechanical seal assembly which is readily assembled and disassembled. It is an object of the present invention to provide a shaft sleeve having integral parts for rotationally locking one or two rotating seal rings to the shaft sleeve in a single or dual mechanical seal arrangement. It is an object of the present invention to provide a mechanical seal having a single shaft sleeve which mounts one or two mechanical seals thereon without need for a double sleeve design.

The objects of the present invention are achieved in that a shaft sleeve is provided which has fixed tabs at an inboard side thereof to register with corresponding notches in a rotary seal ring, and flexible tabs on an outboard side of the sleeve which can be depressed radially inwardly to allow annular components of the seal assembly to be slid axially past the flexible tabs wherein, and when notches formed in the outboard rotary seal ring register with said flexible tabs, said flexible tabs provide rotary anchorage of the outboard rotary seal ring. The flexible tabs are arranged spaced apart circumferentially on the sleeve and are advantageously formed as cantilevers formed into a sidewall of the sleeve by removing an approximate U-shaped portion of the sidewall. The flexible tabs provide, extending outwardly of the outer surface of the sleeve, raised formations having slanted sidewalls in the axial direction of the sleeve which assists in leveraging radially inwardly the cantilevers when a ring passes thereover in either an assembly or a disassembly direction.

DETAILED DESCRIPTION OF THE PREFERRED EMBODIMENTS

Figure 1:
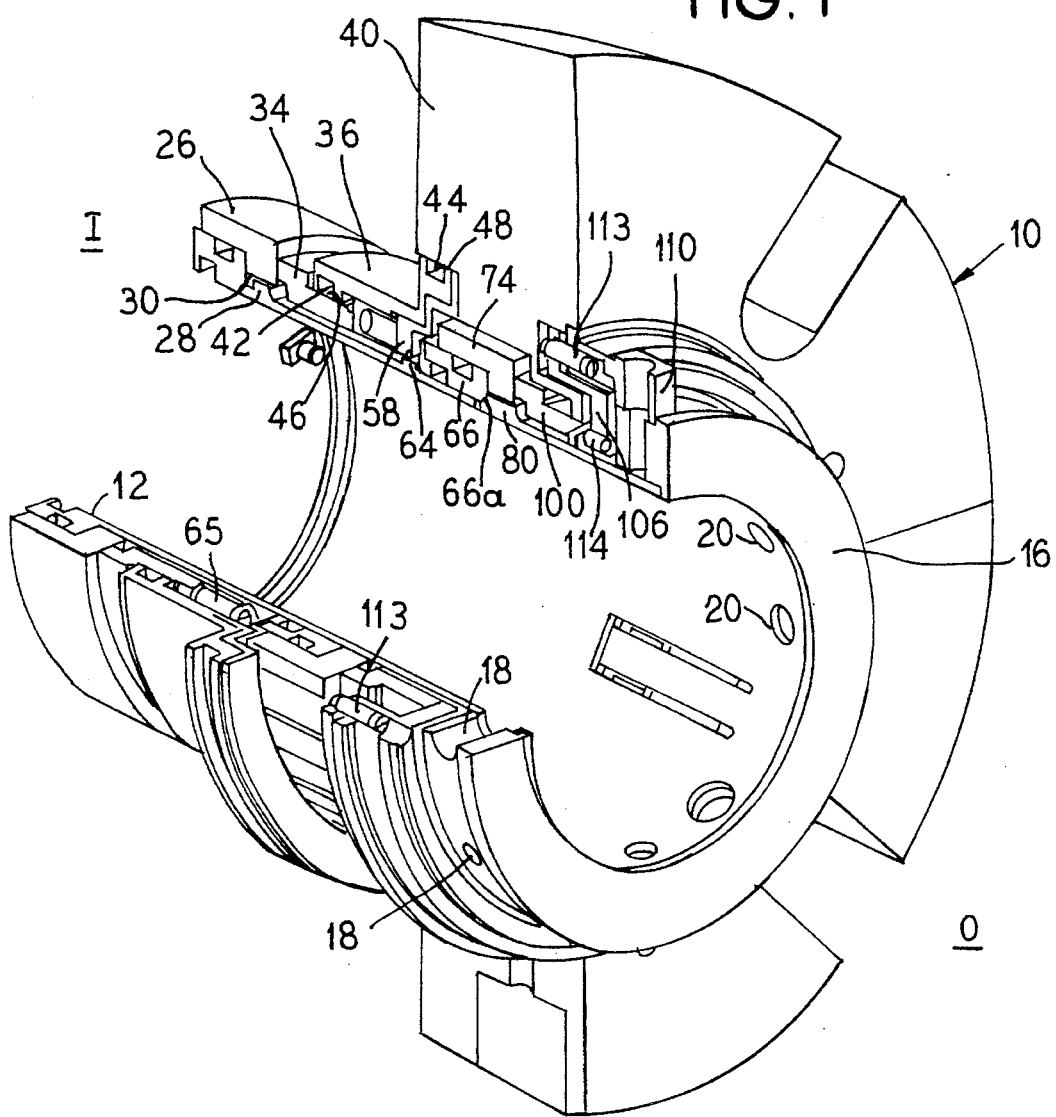
FIG. 1 is a perspective view of a seal assembly of the present invention, having sections removed for illustration.
Figure 2:
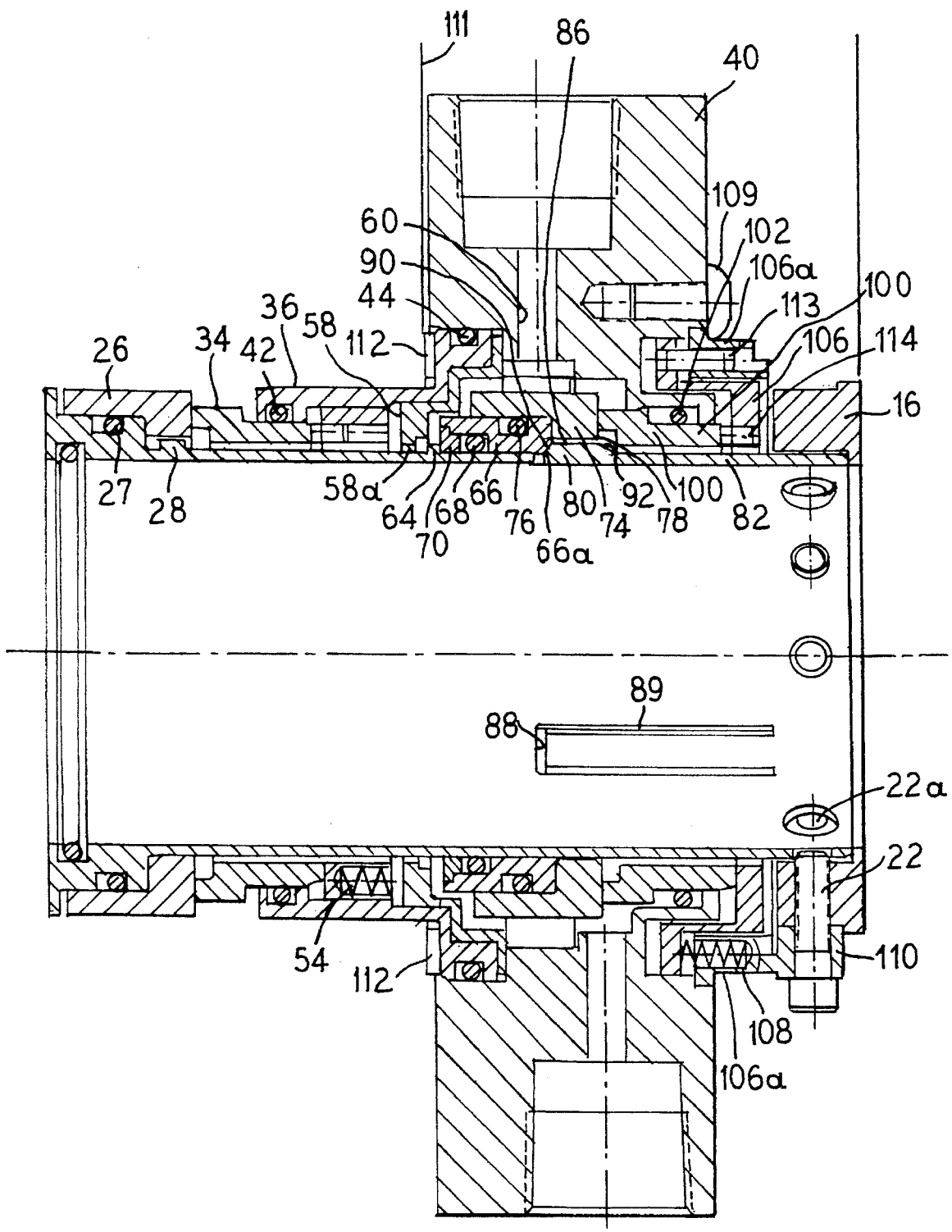
FIG. 2 is a longitudinal sectional view of the seal assembly of FIG. 1.

FIGS. 1 and 2 illustrate a seal assembly 10 having circumferential sections removed for illustrative purposes. A shaft sleeve 12 fits closely around a shaft such as a pump shaft to be sealed to a pump casing (not shown). A lock ring 16 is provided to anchor the sleeve 12 to the shaft. The lock ring provides a plurality of threaded apertures 18 which register with apertures 20 through the sleeve 12 for fixing the position of the sleeve 12 onto the shaft by a plurality of set screws 22a. On an inboard side I of the assembly 10 and surrounding the sleeve 12 is a rotary seal ring 26 which is keyed to and rotates with the sleeve 12 by a fixed lug 28 protruding radially outwardly from the sleeve 12 and interfit within a notch 30 on a radially inward side of the seal ring 26. A plurality of such lugs 28, such as three, are provided spaced apart around the sleeve 12. Abutting closely to the rotating seal ring 26 is a stationary seal ring 34. The stationary seal ring 34 is sealed to a secondary seal holder 36 which is sealed to a gland housing 40. O-ring seals 42, 44 are interfit within annular notches 46, 48 respectively to seal between the stationary seal ring 34 and the gland housing 40 respectively.

The stationary seal ring 34 is spring loaded against the rotary seal ring 26 by a plurality of springs 54 such as shown in FIG. 2. The rotary seal ring 26 and the stationary seal ring 34 form a first mechanical seal in the seal assembly 10. An adaptor ring 58 having a tri-stepped profile is applied between the holder and the gland. The adaptor ring 58 provides a passage 58a therethrough for distributing barrier fluid from a gland inlet 60 to the first mechanical seal. On an outboard side of the adaptor ring 58 are a plurality of stops 64 arranged spaced apart around the circumference of the sleeve 12. The springs 54 are captured between the adaptor ring 58 and the stationary ring 34. Additionally, a plurality of pins 65 are provided for rotationally locking the adaptor ring 58 to the stationary ring 34 to insure non-rotation of the stationary ring 34.

Arranged next in an outboard direction is a collar 66 having an O-ring seal 68 and a back-up ring 70 which abuts the stops 64. The collar is sealed to a rotary seal ring 74 by a second O-ring 76. The rotary seal ring 74 comprises a plurality of notches 78 which register with a plurality of flexible anchors 80 formed on the inner sleeve 12. The flexible anchors 80 are spaced apart around a circumference of the sleeve 12 and comprise cantilever lever arm portions 82 and raised formations 86 protruding outwardly from the sleeve 12. Each cantilever arm 82 and the raised formation 86 are formed within a slot 88 in the material of the sleeve 12. The flexible anchor 80 can be formed by cutting a U-shaped channel 89 in the material of the sleeve 12. The formation 86 comprises in an axial direction an inclined leading face 90 and an inclined trailing face 92, each at approximately 45°, which facilitate the successive sliding on or off of rings, such as the stationary seal ring 34, onto the sleeve, the rings depressing the flexible anchor 80 radially inwardly to pass thereby in an axial direction.

The collar 66 provides an outboard facing inclined face 66a which mates flushly with the trailing face 92 of the formation 86. When the formation springs radially outwardly it exerts an inboard force on the collar to clamp the collar and the back-up ring 70 between the stops 64 and the formation 86 to assure rotary squareness of the collar and thus the rotary seal ring 74 pressed thereto.

A stationary seal ring 100 abuts the rotary seal ring 74 to form the second mechanical seal for the seal assembly 10. The stationary seal ring 100 is sealed by an O-ring 102 to the gland housing 40. A spring retaining ring 106 is provided on an outboard side of the stationary seal ring 100 to urge the stationary seal ring 100 against the rotary seal ring 74. A plurality of springs 108 spaced around a circumference of the retaining ring 106 bias the spring retaining ring 106 from a backing ring 106a which is held by a plurality of button head cap screws 109, screwed into the gland 40. Three centering clips 110 are screwed to the lock ring 16 to radially center the stationary components of the seal assembly, at the backing ring 106a, about the shaft before the gland 40 is bolted to the pump casing 111 (bolts not shown). The centering clips are removed before operation of the seal. A seal 112 is provided between the casing 111 and the gland.

The backing ring 106a and the retaining ring are locked together for non-rotation by pins 113. The retaining ring 106 and the stationary seal ring 100 are locked together for non-rotation by pins 114.

Figure 3:
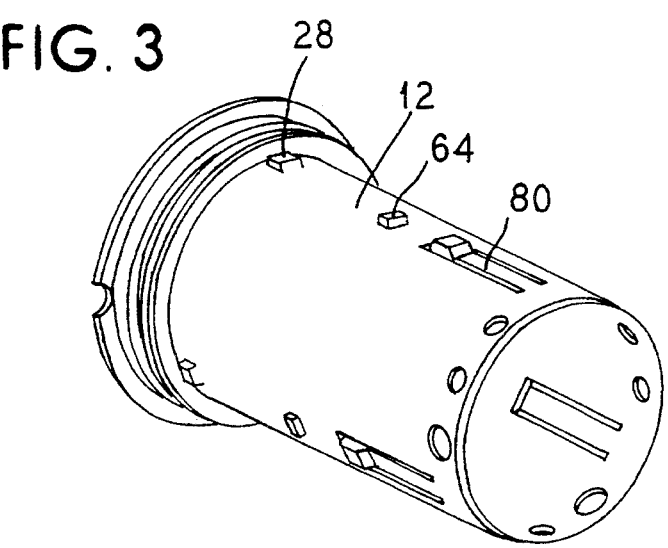
FIG. 3 is a perspective view of a sleeve from FIG. 1.

As shown in FIG. 3, the sleeve 12 provides the fixed lug 28, the stop 64 and the flexible anchor 80 in an approximately axial line, three such axial lines arranged at approximately 120° around the circumference of the sleeve 12.

As can be appreciated by viewing FIGS. 1 and 2, the inventive sleeve allows for a quick and error-free assembly of the seal assembly 10. The sleeve 12 can have the following components, in order, slid or stacked onto the sleeve 12 in an efficient manner: the O-ring 27, the rotary seal 26, the stationary seal ring 34, the holder 36 with O-ring 42, 44 installed, the springs 54, the adaptor ring 58, the retaining ring 70, the O-ring 68, the collar 66 with O-ring 76 installed, the rotary seal ring 74, the stationary seal ring 100, the O-ring 102, the gland body 40, the spring retaining ring 106, the springs 108, the backing ring 106a, the locking ring 16, with the centering clips 110. Once the sleeve and components thereon is installed onto the shaft, the flexible anchors 80 are prevented from radial inward retraction by the shaft and thus provide a rigid axial retainage of inboard side components and rotary retainage of the rotary seal ring 74.

Although the present invention has been described with reference to a specific embodiment, those of skill in the art will recognize that changes may be made thereto without departing from the scope and spirit of the invention as set forth in the appended claims.

We claim as our invention:

1. A support and sealing rings of a mechanical seal assembly, the support mounted onto a shaft of a fluid handling device, the mechanical seal sealing between the shaft and a casing of the fluid handling device, comprising:

a first sealing ring and a second sealing ring; and an annular support structure having an axial length from a first open end to a second open end, said support structure shaped for receiving a shaft therein, and having a flexible anchor portion depressible radially inwardly to allow axial passage of said first sealing ring thereover from the first end toward the second end and resiliently returnable to a radial position to register into a notch in said second sealing ring and rotationally lock said second sealing ring slid thereonto.

2. The support and sealing rings according to claim 1, wherein the support structure comprises a sleeve for closely surrounding said shaft and said flexible anchor portion comprises a cantilevered lever extending from its base end in the axial direction of the sleeve, and having a raised formation on a distal end of the lever extending radially outwardly of an outer surface of said sleeve.

3. The support and sealing rings according to claim 2 further comprising fixed anchor portions near said second end of said flexible anchor portions for rotationally locking a third sealing ring to said sleeve.

4. The support and sealing rings according to claim 2, wherein said cantilever lever is surrounded by a U-shaped void in said sleeve.

5. The support and sealing rings according to claim 2, wherein said raised formation comprises an inclined leading edge and a declined trailing edge to cause radial depression of said raised formation when a ring is slid thereover from a leading side or a trailing side respectively.

6. The support and sealing rings according to claim 1 further comprising at least one additional flexible anchor portion spaced around the circumference of the sleeve from said flexible anchor portion and registerable into a second notch in said second sealing ring.

7. A cartridge mechanical seal for a shaft of a pump, to seal the shaft to a casing of the pump, comprising:

a shaft sleeve having an axial length from a first end to a second end, the shaft sleeve having at least one fixed anchor extending radially from an outer surface of the sleeve at the second end, and at least one flexible anchor arranged on said sleeve between said first end and said fixed anchor and depressible radially inwardly of the outer surface of said sleeve to allow a ring which conforms around said outer surface to pass thereby from said first end toward the second end; and a first rotary seal ring having at least one first notch on a radially inside circumference registerable with the fixed anchor, said first rotary seal ring carried on an outside circumference of said sleeve at the second end of the sleeve; and a second rotary seal ring having at least one second notch on an inside circumference thereof, said second rotary seal ring conforming around an outside circumference of said sleeve, said second notch registering with said flexible anchor portion to lock said second rotary seal ring to said sleeve for rotation; and first and second stationary seal rings carried around an outer circumference of said sleeve and abutting said first and second rotary seal rings respectively for forming a first and second seal therebetween respectively.

8. The seal according to claim 7 further comprising a gland surrounding said sleeve and providing a passageway for supplying barrier fluid between said rotary seal rings.

9. The seal according to claim 7, wherein said flexible anchor comprises a raised formation for registering within said second notch, said raised formation having an inclined leading edge and a declined trailing edge for causing inward radial depression of said resilient anchor portion upon an axial force at either of said leading edge or trailing edge.

10. The seal according to claim 9, wherein said flexible anchor comprises a cantilever lever residing within a slot through a wall of said sleeve, and said raised formation is located on a free end of said cantilever lever.

11. The seal according to claim 7, wherein said at least one fixed anchor comprises a plurality of fixed anchors and said at least one flexible anchor comprises a plurality of flexible anchor portions, and said fixed anchor portions and said flexible anchor portions are aligned axially and spaced in pairs around a circumference of said sleeve.

12. The seal according to claim 7 comprising a stop formation extending radially outwardly of said sleeve between said flexible anchor and said fixed anchor; and a collar having a first surface in abutment with said second rotary seal ring and an opposite surface in abutment with said stop formation.

13. The seal according to claim 12, wherein said flexible anchor comprises an inclined face and said collar comprises a complementary inclined face, said collar held between said stop formation and said flexible anchor as said complementary inclined face presses said inclined face flushly.

14. A cartridge mechanical seal for a shaft of a pump, comprising:
   a shaft sleeve having an axial length from a first end to a second end, the shaft sleeve having a stop formation extending radially from an outer surface of the sleeve, and a flexible anchor arranged on said sleeve between said first end and said stop formation and depressible radially inwardly of the outer surface of said sleeve;
   a collar surrounding said sleeve between said stop formation and said flexible anchor and having a first surface in abutment with said stop formation and a second surface, opposite to said first surface, abuttable axially by said flexible anchor, said flexible anchor radially retractable to permit axial installation of said collar from said first end and returnable to abut said collar, said collar having a third surface around a circumference of said collar and facing said first end;
   a rotary seal ring having a first surface around a circumference of said rotary seal ring and abuttable to said third surface of said collar for assuring rotary squareness of said rotary seal ring with respect to said sleeve; and
   a stationary seal ring forming a mechanical seal with said rotary seal ring.

15. The seal according to claim 14, wherein said rotary seal ring comprises a notch for registry by said flexible anchor to lock said rotary seal ring for rotation with said sleeve.

16. The seal according to claim 14, wherein said flexible anchor comprises a cantilever lever having a raised formation on a free end thereof which provides a first surface for abutment with said second surface of said collar, said cantilever lever having a base end fixed to said sleeve and said cantilever lever residing in a slot formed through said sleeve.

17. The seal according to claim 16, wherein said first surface of said raised formation and said second surface of said collar are inclined radially and are planarly parallel.

18. A sleeve and seal ring assembly, the sleeve for receiving a rotary shaft, said sleeve for mounting seal rings to the rotary shaft for sealing between the rotary shaft and a stationary housing supporting said rotary shaft, comprising:
   first and second seal rings;
   a cylindrical thin wall body having a first open end and a second open end, said body sized to closely surround said shaft;
   at least one fixed lug protruding from said body radially and located adjacent said second open end for rotationally fixing said first seal ring to said body;
   at least one flexible anchor protruding a distance from said body radially but resiliently depressible inwardly, located axially between said fixed lug and said first open end; and
   said flexible anchor depressible inwardly for allowing axial passby of said second seal ring having an inside diameter larger than an outside diameter of said body but smaller than an outside clearance delimited by said body and said protruding distance of said flexible anchor.

19. The sleeve and seal ring assembly according to claim 18, wherein said at least one fixed lug comprises three fixed lugs spaced around a circumference of said body and said at least one flexible anchor comprises three flexible anchors spaced around a circumference of said body.

20. The sleeve and seal ring assembly according to claim 19, wherein said fixed lugs and said flexible anchors are rotationally aligned in one-to-one correspondence.

21. The sleeve and seal ring assembly according to claim 18, further comprising a plurality of stop formations, each extending radially outwardly from said body and spaced around a circumference of said body, said stop formations located axially between said fixed lug and said flexible anchor.

22. The sleeve and seal ring assembly according to claim 18, wherein said flexible anchor comprises a cantilevered lever extending from its base end in the axially direction of the body, and having a raised formation on a distal end of the lever extending radially outwardly of an outer surface of said body.

23. The sleeve and seal ring assembly according to claim 22, wherein said cantilevered lever is surrounded by a U-shaped void in said body.

24. The sleeve and seal ring assembly according to claim 22, wherein said raised formation comprises an inclined leading edge and a declined trailing edge to cause radial depression of said raised formation when a sealing ring is slide thereover.

* * * * *